United States Patent
Pani et al.

(10) Patent No.: US 9,888,522 B2
(45) Date of Patent: *Feb. 6, 2018

(54) METHOD AND APPARATUS FOR ENABLING AND DISABLING A SUPPLEMENTARY DOWNLINK CARRIER

(71) Applicant: InterDigital Patent Holdings, Inc., Wilmington, DE (US)

(72) Inventors: Diana Pani, Montreal (CA); Benoit Pelletier, Roxboro (CA); Christopher R. Cave, Dollard-des-Ormeaux (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 128 days.

This patent is subject to a terminal disclaimer.

(21) Appl. No.: 14/834,256

(22) Filed: Aug. 24, 2015

(65) Prior Publication Data

US 2015/0365998 A1 Dec. 17, 2015

Related U.S. Application Data

(63) Continuation of application No. 12/615,871, filed on Nov. 10, 2009, now Pat. No. 9,155,122.

(Continued)

(51) Int. Cl.
*H04W 76/06* (2009.01)
*H04L 1/18* (2006.01)
*H04W 52/02* (2009.01)
*H04W 72/04* (2009.01)
*H04W 76/04* (2009.01)

(52) U.S. Cl.
CPC ......... *H04W 76/064* (2013.01); *H04L 1/1812* (2013.01); *H04L 1/1822* (2013.01); *H04L 1/1835* (2013.01); *H04W 52/0216* (2013.01); *H04W 72/042* (2013.01); *H04W 76/046* (2013.01); *Y02B 60/50* (2013.01)

(58) Field of Classification Search
CPC ... H04L 1/1812; H04L 1/1822; H04L 1/1835; H04W 52/216; H04W 72/042; H04W 76/046; H04W 76/064; Y02B 60/50
USPC ........................................................ 370/252
See application file for complete search history.

(56) References Cited

U.S. PATENT DOCUMENTS 7,437,164 B2    10/2008   Agrawal et al.
2003/0147371 A1  8/2003   Choi et al.
(Continued)

FOREIGN PATENT DOCUMENTS

CN    101002496 A    7/2007
CN    101282205 A    10/2008
(Continued)

OTHER PUBLICATIONS

3rd Generation Partnership Project (3GPP), R1-083293, "Discussion on Activation/Deactivation of Dual-Cell HSDPA", Samsung, 3GPP TSG RAN WG1 Meeting #54, Jeju, Korea, Aug. 18-22, 2008, 7 pages.

(Continued)

*Primary Examiner* — Stephen J Clawson
(74) *Attorney, Agent, or Firm* — Condo Roccia Koptiw LLP (57) ABSTRACT

A method and apparatus are disclosed for multi cell wireless communication, wherein a status of a secondary serving cell is determined. On the condition that the secondary serving cell is disabled, a Hybrid Repeat Request (HARQ) process associated with the secondary serving cell is released.

26 Claims, 6 Drawing Sheets

Related U.S. Application Data (60) Provisional application No. 61/113,149, filed on Nov. 10, 2008.

(56) References Cited

U.S. PATENT DOCUMENTS

| | | | |
|---|---|---|---|
| 2003/0210669 | A1 | 11/2003 | Vayanos et al. |
| 2004/0116143 | A1 | 6/2004 | Love et al. |
| 2004/0208160 | A1 | 10/2004 | Petrovic et al. |
| 2005/0094586 | A1 | 5/2005 | Zhang et al. |
| 2006/0034285 | A1 | 2/2006 | Pirskanen et al. |
| 2006/0035594 | A1 | 2/2006 | Murata et al. |
| 2006/0089142 | A1 | 4/2006 | Vuorinen et al. |
| 2006/0281465 | A1 | 12/2006 | McBeath et al. |
| 2007/0047445 | A1 | 3/2007 | Usuda et al. |
| 2007/0047452 | A1 | 3/2007 | Lohr et al. |
| 2008/0008152 | A1 | 1/2008 | Lohr et al. |
| 2008/0019320 | A1 | 1/2008 | Phan et al. |
| 2008/0233939 | A1 | 9/2008 | Kuo |
| 2008/0233950 | A1 | 9/2008 | Kuo et al. |
| 2008/0247349 | A1 | 10/2008 | Hsieh et al. |
| 2010/0118723 | A1 | 5/2010 | Pani et al. |

FOREIGN PATENT DOCUMENTS

| | | | |
|---|---|---|---|
| JP | 2003-284135 | A | 10/2003 |
| JP | 2006-505219 | A | 2/2006 |
| JP | 2007-053747 | A | 3/2007 |
| JP | 2008-514151 | A | 5/2008 |
| JP | 2008-245279 | A | 10/2008 |
| JP | 5401554 | B2 | 1/2014 |
| RU | 2007101380 | A | 7/2008 |
| RU | 2007105977 | A | 9/2008 |
| WO | WO 2004/042954 | A1 | 5/2004 |
| WO | WO 2006/035297 | A2 | 4/2006 |
| WO | WO 2006/038066 | A2 | 4/2006 |
| WO | WO 2006/100597 | A1 | 9/2006 |
| WO | WO 2010/054376 | A1 | 5/2010 |

OTHER PUBLICATIONS

3rd Generation Partnership Project (3GPP), R2-084450, "MAC Modifications Due to DC-HSDPA", Qualcomm Europe, 3GPP TSG-RAN WG2 #63, Jeju, Korea, Aug. 18-Aug. 22, 2008, 21 pages.

3rd Generation Partnership Project (3GPP), R2-091412, "Handling of Secondary Serving HS-DSCH Cell Re-Activation", 3GPP TSG-WG2 Meeting #65, Athens, Greece, Feb. 9-13, 2009, 2 pages.

3rd Generation Partnership Project (3GPP), R2-091870, "Correction to Activation/Deactivation of Secondary Cell Reception", 3GPP TSG RAN WG2 meeting #65, Athens, Greece, Feb. 9-13, 2009, 11 pages.

3rd Generation Partnership Project (3GPP), TS 25.415 V3.2.0, "Technical Specification Group Radio Access Network, UTRAN Iu Interface User Plane Protocols (Release 1999)", Mar. 2000, pp. 1-55.

3rd Generation Partnership Project (3GPP), R1-01-1322, "Enhancing the Uplink DSCH—Scheduling Options", Lucent Technologies, 3GPP TSG-RAN1 #29, Shanghai, China, Nov. 5-8, 2002, 6 pages.

3rd Generation Partnership Project (3GPP), R1-081438, "Dual Carrier Operation for CELL_DCH", Qualcomm Europe, 3GPP TSG-RAN WG1 #52bis, Shenzhen, China, Mar. 31-Apr. 4, 2008, 5 pages.

3rd Generation Partnership Project (3GPP), R2-081899, "Dual Cell HSDPA Operation Consideration", Huawei, 3GPP TSG-RAN WG2 #61bis, Shenzhen, China, Mar. 31-Apr. 4, 2008, 2 pages.

3rd Generation Partnership Project (3GPP), R2-086452, "Corrections to Dual Cell Operation", Ericsson, Change Request, 25.308 CR, Current version: 8.3.0, 3GPP TSG RAN WG2 meeting #64, Prague, Czech Republic, Nov. 10-14, 2008, 4 pages.

3rd Generation Partnership Project (3GPP), R2-086454, "Introduction of Dual Cell Operation", Ericsson, Change Request, 25.321 CR, Current version: 8.3.0, 3GPP TSG RAN WG2 meeting #63bis, Prague, Czech Republic, Nov. 10-14, 2008, 7 pages.

3rd Generation Partnership Project (3GPP), R2-086455 "Introduction of Dual Cell operation," Ericsson, TSG RAN WG2 meeting #64, Nov. 2008, 1-85.

3rd Generation Partnership Project (3GPP), R3-001735, "Corrections to a Minor Mistake Present in the Spec", CSELT, 3GPP TSG-RAN-WG3 Meeting #14, Helsinki, Finland, Jul. 3-7, 2000, 5 pages.

3rd Generation Partnership Project (3GPP), R1-083117, "HARQ Processes in DC-HSDPA", InterDigital, 3GPP TSG-RAN WG2#63, Jeju Island, South Korea, Aug. 18-22, 2008, 4 pages.

Samsung, "SPS resource release," 3GPP TSG-RAN2#63 meeting, R2-084455, Aug. 2008.

Huawaei, "Text Proposal for PDCP Discard," 3GPP TSG-RAN WG2 Meeting #63, R2-084050, Aug. 2008.

3rd Generation Partnership Project (3GPP), TS 25.308 V8.3.0, "Technical Specification Group Radio Access Network, High Speed Downlink Packet Access (HSDPA), Overall Description, Stage 2 (Release 8)", Sep. 2008, 1-56.

3rd Generation Partnership Project (3GPP), TS 25.308 V8.7.0, "Technical Specification Group Radio Access Network, High Speed Downlink Packet Access (HSDPA), Overall Description, Stage 2 (Release 8)", Sep. 2009, 1-65.

3rd Generation Partnership Project (3GPP), TS 25.308 V9.1.0, "Technical Specification Group Radio Access Network, High Speed Downlink Packet Access (HSDPA), Overall Description Stage 2 (Release 9)", Sep. 2009, 1-65.

3rd Generation Partnership Project (3GPP), TS 25.321 V8.3.0, "Technical Specification Group Radio Access Network, Medium Access Control (MAC) protocol specification (Release 8)," Sep. 2008, 1-167.

3rd Generation Partnership Project (3GPP), TS 25.321 V8.7.0, "Technical Specification Group Radio Access Network, Medium Access Control (MAC), protocol specification (Release 8)", Sep. 2009, 1-187.

3rd Generation Partnership Project (3GPP), TS 25.321 V9.0.0, "Technical Specification Group Radio Access Network, Medium Access Control (MAC), protocol specification (Release 9)" Sep. 2009, 1-187.

3rd Generation Partnership Project (3GPP), TS 25.331 V8.4.0, "Technical Specification Group Radio Access Network, Radio Resource Control (ARC), Protocol Specification (Release 8)", Sep. 2008, 1-1543.

3rd Generation Partnership Project (3GPP), TS 25.331 V8.8.0, "Technical Specification Group Radio Access Network, Radio Resource Control (ARC), Protocol Specification (Release 8)", Sep. 2009, 1-1697.

3rd Generation Partnership Project (3GPP), TS 25.331 V9.0.0, "Technical Specification Group Radio Access Network, Radio Resource Control (ARC), Protocol Specification (Release 9)", Sep. 2009, 1-1710.

METHOD AND APPARATUS FOR ENABLING AND DISABLING A SUPPLEMENTARY DOWNLINK CARRIER

CROSS REFERENCE TO RELATED APPLICATIONS

This application is a continuation of U.S. patent application Ser. No. 12/615,871 filed Nov. 10, 2009, which claims benefit of U. S. provisional application No. 61/113,149 filed on Nov. 10, 2008, which are incorporated by reference as if fully set forth herein.

FIELD OF INVENTION

This application is related to wireless communications.

BACKGROUND

Wireless communication systems are evolving to meet the needs of providing continuous and faster access to a data network. In order to meet these needs, wireless communication systems may use multiple carriers for the transmission of data. A wireless communication system that uses multiple carriers for the transmission of data may be referred to as a multi-carrier system. The use of multiple carriers is expanding in both cellular and non-cellular wireless systems.

A multi-carrier system may increase the bandwidth available in a wireless communication system according to a multiple of how many carriers are made available. For example, a dual carrier system may double the bandwidth when compared to a single carrier system, a tri-carrier system may triple the bandwidth when compared to a single carrier system, etc.

In addition to this throughput gain, diversity and joint scheduling gains may also be expected. This may result in the improvement of the quality of service (QoS) for end users. Further, the use of multiple carriers may be used in combination with multiple-input multiple-output (MIMO).

By way of example, in the context of third generation partnership project (3GPP) systems, a new feature called dual cell high speed downlink packet access (DC-HSDPA) has been introduced in Release 8 of the 3GPP specifications. With DC-HSDPA, a base station (which may also be referred to as a Node-B, an access point, site controller, etc. in other variations, or types, of communications networks) communicates to a wireless transmit/receive unit (WTRU) over two downlink carriers simultaneously. This not only doubles the bandwidth and the peak data rate available to WTRUs, but also has a potential to increase the network efficiency by means of fast scheduling and fast channel feedback over two carriers.

For DC-HSDPA operation, each WTRU is assigned two downlink carriers: an anchor carrier and a supplementary carrier. The anchor carrier carries all physical layer dedicated and shared control channels associated with transport channels, for example, the high speed downlink shared channel (HS-DSCH), the enhanced dedicated channel (E-DCH), and the dedicated channel (DCH) operations. Such physical layer channels include, by way of example, the fractional dedicated physical channel (F-DPCH), the E-DCH HARQ indicator channel (E-HICH), the E-DCH relative grant channel (E-RGCH), the E-DCH absolute grant channel (E-AGCH), the common pilot channel (CPICH), the high speed shared control channel (HS-SCCH), and the high speed physical downlink shared channel (HS-PDSCH), and the like). The supplementary carrier may carry a CPICH, an HS-SCCH and an HS-PDSCH for the WTRU. The uplink transmission remains on a single carrier in current systems. The high speed dedicated physical control channel (HS-DPCCH) feedback information is provided on the uplink carrier to the Node-B and contains information for each downlink carrier.

Figure 1:
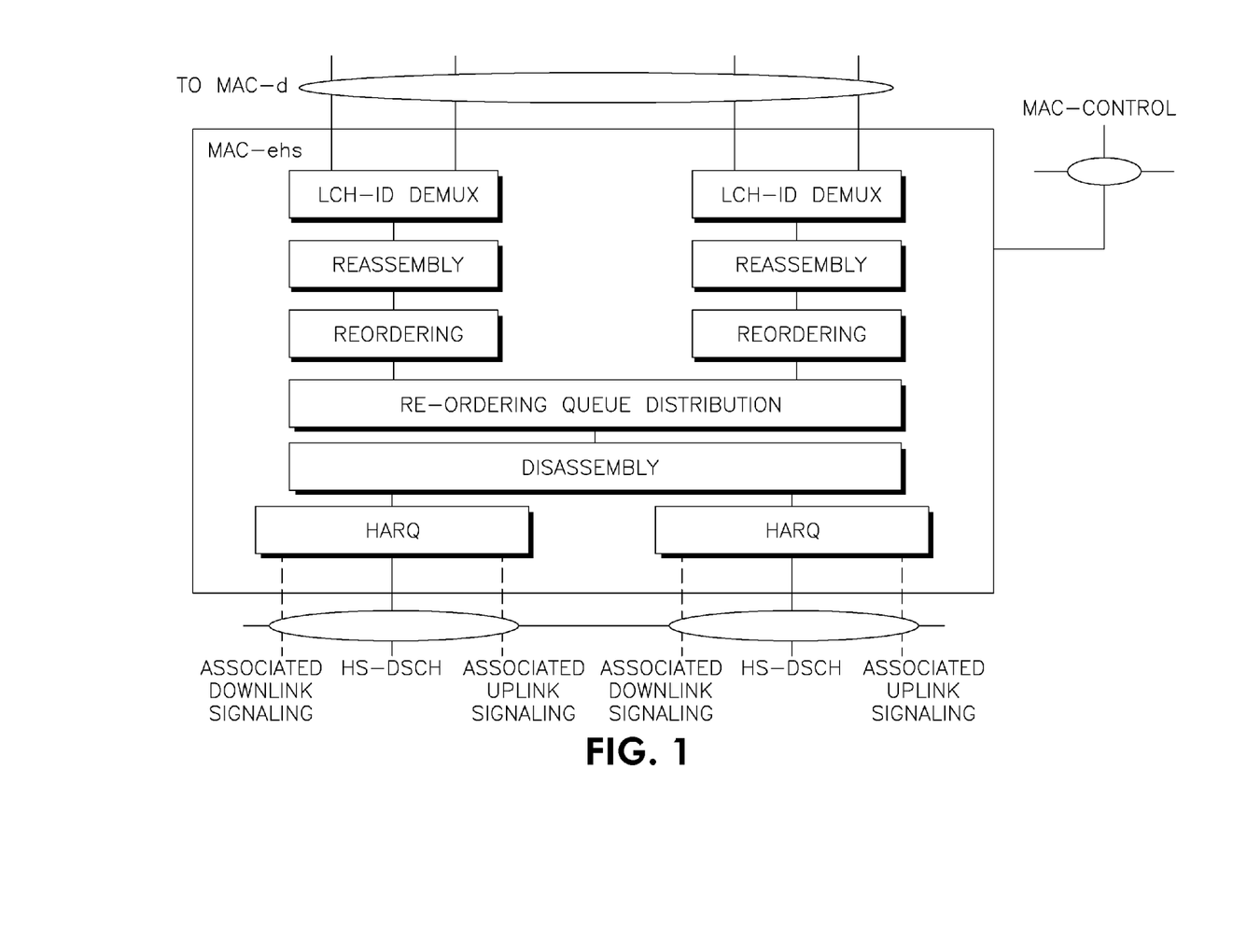
FIG. 1 shows the WTRU-side MAC architecture (MAC-ehs)

The Medium Access Control (MAC-ehs) architecture of a WTRU that is capable of implementing DC-HSDPA is shown in FIG. 1. As shown in FIG. 1, the MAC-ehs comprises two (2) HARQ entities. In DC-HSDPA, each cell may be assigned a separate HARQ entity. Accordingly, disassembly and re-ordering are performed jointly for both cells. In addition, a separate HS-DSCH Radio Network Temporary Identifier (H-RNTI) may be given to each.

While not designed to optimize the radio resource, the MAC-ehs architecture for DC-HSDPA, shown in FIG. 1, simplifies the specification and implementation of the WTRU. In accordance with this architecture, the two cells operate almost as two distinct legacy HS-DSCH cells.

To provide power savings options for a WTRU supporting DC-HSDPA, the temporary disabling of the supplementary carrier may be allowed. Such activation and de-activation may be signaled by the Node-B using Layer 1 (L1) messages in the form of HS-SCCH orders. This fast mechanism allows the Node-B to enable, or disable, the supplementary carrier for each WTRU supporting the feature independently.

The introduction of DC-HSDPA however causes a number of issues that need to be resolved to ensure proper and predictable WTRU behavior. In the legacy WTRUs, there may be a single HARQ entity per MAC entity and a single serving HS-DSCH cell. Thus, when the WTRU performs a handover or a channel reconfiguration, it may simply reset the MAC-ehs entirely to start afresh. With DC-HSDPA, however, the MAC-ehs comprises two HARQ entities, which may need to be considered separately in some circumstances. Indeed, when the secondary HS-DSCH serving cell is disabled, resetting the entire MAC-ehs may not be appropriate as the serving HS-DSCH cell may still be using it.

Figure 2:
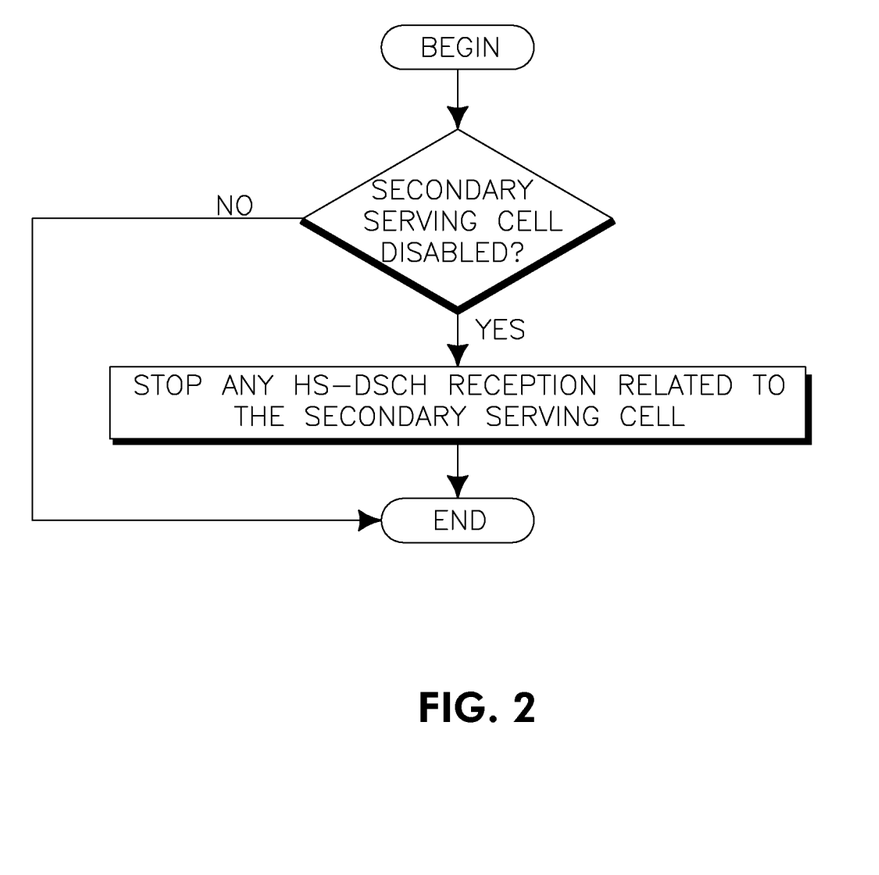
FIG. 2 shows a WTRU procedure for disabling the secondary serving HS-DSCH cell.

FIG. 2 shows a WTRU procedure for disabling the secondary serving HS-DSCH cell. However, this procedure may not provide all the necessary steps for properly handling the disabling of the second HARQ entity and may be missing the required actions related to the H-RNTI variable.

Additional problems may occur when deactivating a secondary cell in DC_HSPA. When de-activating and re-activating the secondary serving HS-DSCH cell using HS-SCCH orders, it may be desirable to flush the HARQ entity associated with the secondary serving HS-DSCH cell to ensure predictable behavior.

A data indicator (e.g. the "New data indicator"), may be a one bit signal, transmitted as part of the HS-SCCH type 1 to indicate that a Packet Data Unit (PDU) is being transmitted in that HARQ process. This may allow the WTRU to overwrite that part of the HARQ memory. Currently, the network-side HARQ process sets the data indicator in transmitted MAC-hs PDUs. When this is performed, the UTRAN sets the data indicator to the value "0" for the first MAC-hs PDU transmitted by a HARQ process. The data indicator may not be incremented for retransmissions of a MAC-hs PDU. The data indicator may be incremented by one for each transmitted MAC-hs PDU containing new data.

Accordingly, the data indicator may toggle when a new PDU is being transmitted. In the current specifications, it is unclear whether upon re-activation of the secondary HS-DSCH serving cell, via HS-SCCH order, the UTRAN resets the data indicator or not. Thus, in addition to flushing the HARQ entity associated with the secondary serving HS-DSCH cell, it may be desirable to also specify the expected behavior with respect to the data indicator.

Therefore, there exists a need for an improved method and apparatus for handling the activation and deactivation, of a supplementary cell.

SUMMARY

A method and apparatus are disclosed for multi cell wireless communication, wherein a status of a secondary serving cell is determined. On the condition that the secondary serving cell is disabled, a Hybrid Repeat Request (HARQ) process associated with the secondary serving cell is released.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, a machine to machine (M2M) device, a sensor, or any other type of device capable of operating in a wireless environment. When referred to hereafter, the terminology "base station" includes but is not limited to a Node-B, a site controller, an access point (AP), or any other type of interfacing device capable of operating in a wireless environment.

A network may assign at least one downlink and/or at least one uplink carrier as an anchor downlink carrier and an anchor uplink carrier, respectively. In multi-carrier operation a WTRU may be configured to operate with two or more carriers, also referred to as frequencies. Each of these carriers may have distinct characteristics and logical association with the network and the WTRU, and the operating frequencies may be grouped and referred to as anchor, or primary carrier, and supplementary, or secondary carrier. Hereinafter, the terminologies "anchor carrier" and "primary carrier", and "supplementary carrier" and "secondary carrier" will be used interchangeably, respectively.

If more than two carriers are configured the WTRU may comprise more than one primary carrier and/or more than one secondary carrier(s). The embodiments described, herein are applicable and can be extended to these scenarios as well. For example, the anchor carrier may be defined as the carrier for carrying a specific set of control information for downlink/uplink transmissions. Any carrier that is not assigned as an anchor carrier may be a supplementary carrier. Alternatively, the network may not assign an anchor carrier and no priority, preference, or default status may be given to any downlink or uplink carriers. Hereinafter, the terms "anchor carrier", "primary carrier", "uplink carrier 1", "first carrier", and "first uplink carrier", are used interchangeably herein for convenience. Similarly, the terms "supplementary carrier", "secondary carrier", "uplink carrier 2", "second carrier", and "second uplink carrier" are also used interchangeably herein. For multi-carrier operation more than one supplementary carriers or secondary carriers may exist.

Figure 3:
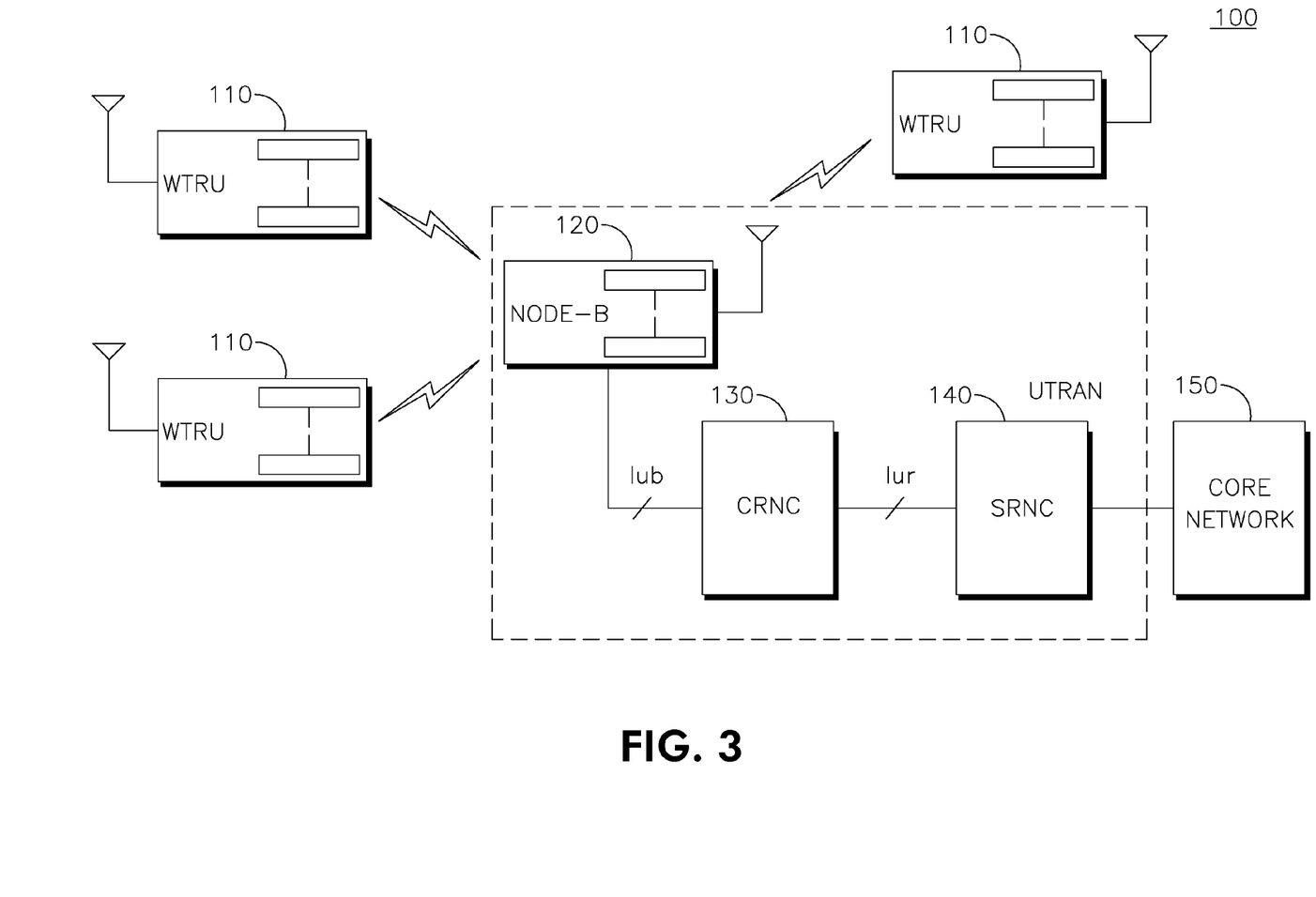
FIG. 3 shows an example wireless communication system where uplink transmissions are handled with a single carrier and downlink transmissions are handled using multiple carriers.

FIG. 3 shows an example wireless communication system 100 where uplink transmissions may be handled with a single carrier 160 and downlink transmissions may be handled using multiple carriers 170. The wireless communication system 100 includes a plurality of WTRUs 110, a Node-B 120, a controlling radio network controller (CRNC) 130, a serving radio network controller (SRNC) 140, and a core network 150. The Node-B 120 and the CRNC 130 may collectively be referred to as the UTRAN.

As shown in FIG. 3, the WTRUs 110 are in communication with the Node-B 120, which is in communication with the CRNC 130 and the SRNC 140. Although three WTRUs 110, one Node-B 120, one CRNC 130, and one SRNC 140 are shown in FIG. 3, it should be noted that any combination of wireless and wired devices may be included in the wireless communication system 100.

Figure 4:
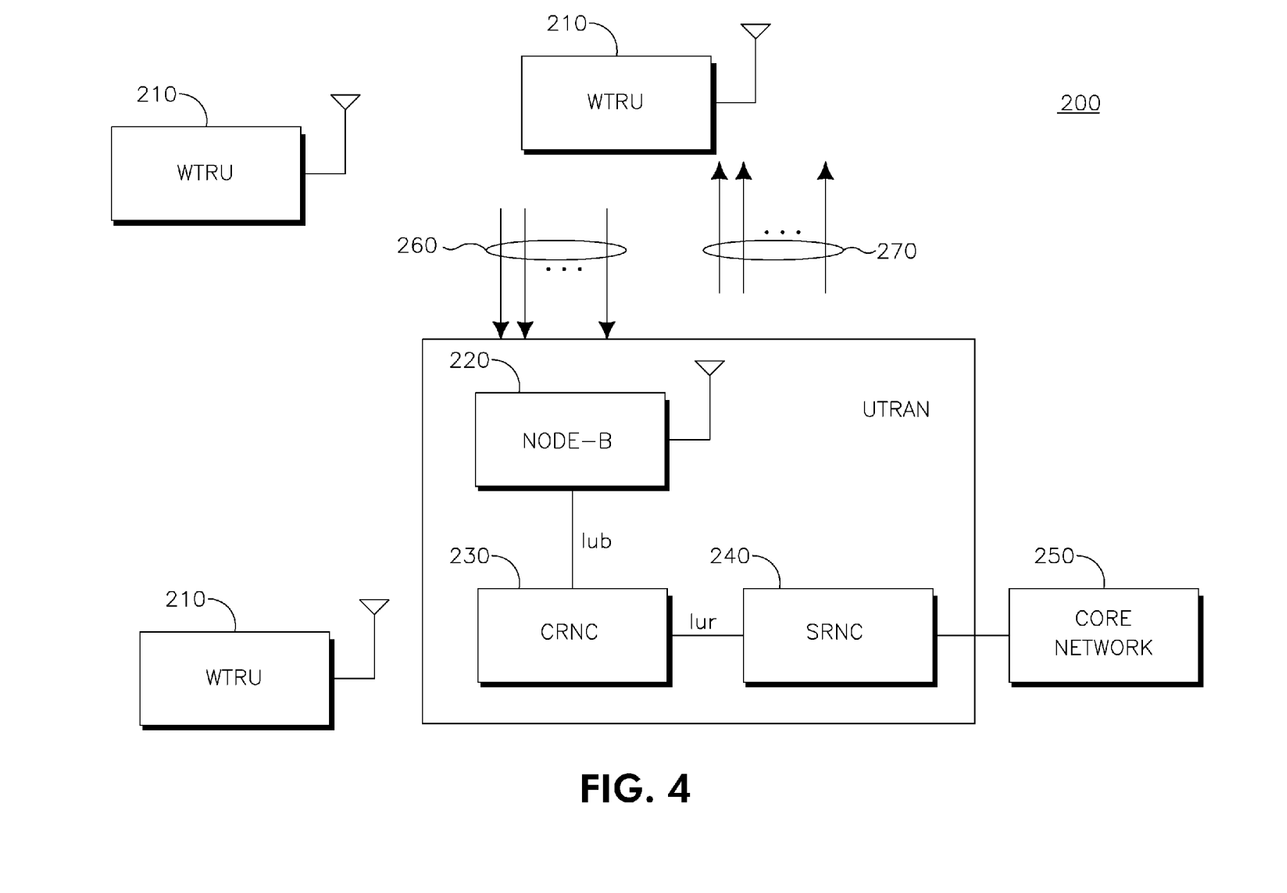
FIG. 4 shows an example wireless communications system according to an example embodiment where uplink transmissions are handled using multiple carriers and downlink transmissions are handled using multiple carriers.

FIG. 4 shows an example wireless communications system 200 according to an example where uplink transmissions are handled using multiple carriers 260, and downlink transmissions are handled using multiple carriers 270. The wireless communication system 200 includes a plurality of WTRUs 210, a Node-B 220, a CRNC 230, a SRNC 240, and a core network 250. The Node-B 220 and the CRNC 230 may collectively be referred to as the UTRAN.

As shown in FIG. 4, the WTRUs 210 are in communication with the Node-B 220, which is in communication with the CRNC 230 and the SRNC 240. Although three WTRUs 210, one Node-B 220, one CRNC 230, and one SRNC 240 are shown in FIG. 4, it should be noted that any combination of wireless and wired devices may be included in the wireless communication system 200.

Figure 5:
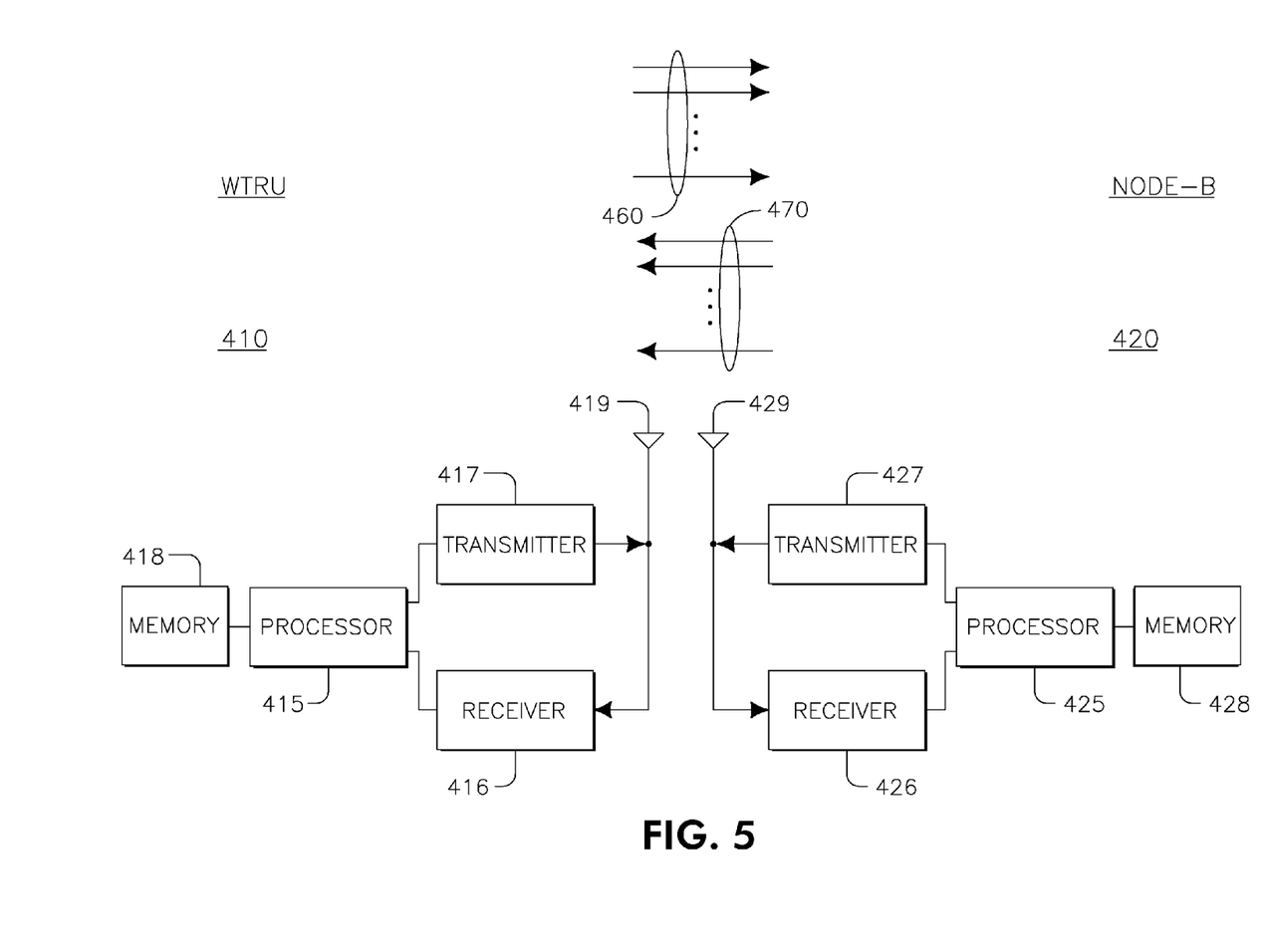
FIG. 5 shows a functional block diagram of an example WTRU and an example Node-B of the wireless communication system of FIG. 4.

FIG. 5 is a functional block diagram of the WTRU 410 and the Node-B 420 of the wireless communication system 200 of FIG. 4. As shown in FIG. 5, the WTRU 410 is in communication with the Node-B 420 and both are configured to perform a method wherein uplink transmissions from the WTRU 410 are transmitted to the Node-B 420 using multiple uplink carriers 460. The WTRU 410 includes a processor 415, a receiver 416, a transmitter 417, a memory 418, an antenna 419, and other components (not shown) that may be found in a typical WTRU. The antenna 419 may include a plurality of antenna elements or plurality of antennas may be included in the WTRU 410. The memory 418 is provided to store software including operating system, application, etc. The processor 415 is provided to perform, alone or in association with software and/or any one or more of the components, a method of performing uplink transmissions with multiple uplink carriers. The receiver 416 and the transmitter 417 are in communication with the processor 415. The receiver 416 and the transmitter 417 are capable of receiving and transmitting one or more carriers simultaneously. Alternatively, multiple receivers and/or multiple transmitters may be included in the WTRU 410. The antenna 419 is in communication with both the receiver 416 and the transmitter 417 to facilitate the transmission and reception of wireless data.

The Node-B 420 includes a processor 425, a receiver 426, a transmitter 427, a memory 428, an antenna 429, and other components (not shown) that may be found in a typical base station. The antenna 429 may include a plurality of antenna elements or plurality of antennas may be included in the Node-B 420. The memory 428 is provided to store software including an operating system, applications, etc. The processor 425 is provided to perform, alone or in association with software and/or any one or more of the components, a method wherein uplink transmissions from the WTRU 410 are transmitted to the Node-B 420 using multiple uplink carriers in accordance with methods disclosed below. The receiver 426 and the transmitter 427 are in communication with the processor 425. The receiver 426 and the transmitter 427 are capable of receiving and transmitting one or more carriers simultaneously. Alternatively, multiple receivers and/or multiple transmitters may be included in the Node-B 420. The antenna 429 is in communication with both the receiver 426 and the transmitter 427 to facilitate the transmission and reception of wireless data.

Methods described herein, provide several approaches for implementing multi-carrier uplink transmission, performing power control on multiple uplink carriers, and allocating power and data across multiple different uplink carriers. It is noted that although methods described herein are described in terms of a dual uplink carrier scenario, it should be understood that the methods described herein are applicable to scenarios where any number of uplink carriers are implemented.

It is also noted that although the methods described herein are described with reference to channels associated with 3GPP Releases 4 through 7, it should be noted that the methods are applicable to further 3GPP releases (and the channels used therein), such as LTE Release 8, as well as any other type of wireless communication system, and the channels used therein. It should also be noted that the methods described herein may be applicable in any order or in any combination.

In multicarrier systems, such as that shown in FIG. 3, WTRUs 110 may include MAC entities (e.g. MAC-ehs) which comprise multiples HARQ, entities, where each HARQ entity may be associated with a different carrier. The anchor carrier and secondary carriers may be activated and deactivated based on WTRU requirements and/or network signaling. For example, it may be desirable, to prevent the resetting of the entire MAC entity when a secondary cell is disabled but other cells remain operational. Accordingly, the WTRU 410 may be configured to utilize signaling from the network 200 to reset predetermined HARQ processes entities. This signaling, for example, may be a layer 3 (L3) message, e.g., radio resource control (RRC) message received from the network indicating that a secondary serving HS-DSCH cell is disabled.

The status of each serving cell may be assigned a status variable indicating its availability for receiving signaling via anchor and secondary carriers. A triggering mechanism may be predetermined or signaled to trigger an evaluation of the variable. In this configuration, a variable value of "False" may indicate that reception is not enabled on a carrier. A value of true may mean reception on the respective carrier is enabled.

For example, in DC-HSDPA the status of a secondary serving HS-DSCH cell reception may be determined using a secondary cell status variable, e.g., SECONDARY_CELL_HS_DSCH_RECEPTION. When the secondary cell status variable is TRUE, the secondary serving HS-DSCH cell may be enabled and ready to be used for HS-DSCH reception. Conversely, when the variable is FALSE, the secondary serving HS-DSCH cell is disabled. Accordingly, the status variable is evaluated by the WTRU 410 each time a new RRC message is received that might affect the status, or whenever required.

In one embodiment, the WTRU 410 may be configured to evaluate the status variable of the carriers based on a trigger (e.g. RRC signaling). On a condition that that the status variable for the anchor carrier is set to FALSE (indicating reception is not available), then the WTRU 410 may be configured to assume that reception on the secondary carrier(s) is also disabled. Accordingly, the WTRU 410 may be configured to perform a reset on the entire MAC entity.

Alternatively, if the status variable for the anchor carrier is set to FALSE, the WTRU 410 may be configured to determine the status variable for each secondary carrier and accordingly reset the HARQ processes for selected secondary carriers.

Figure 6:
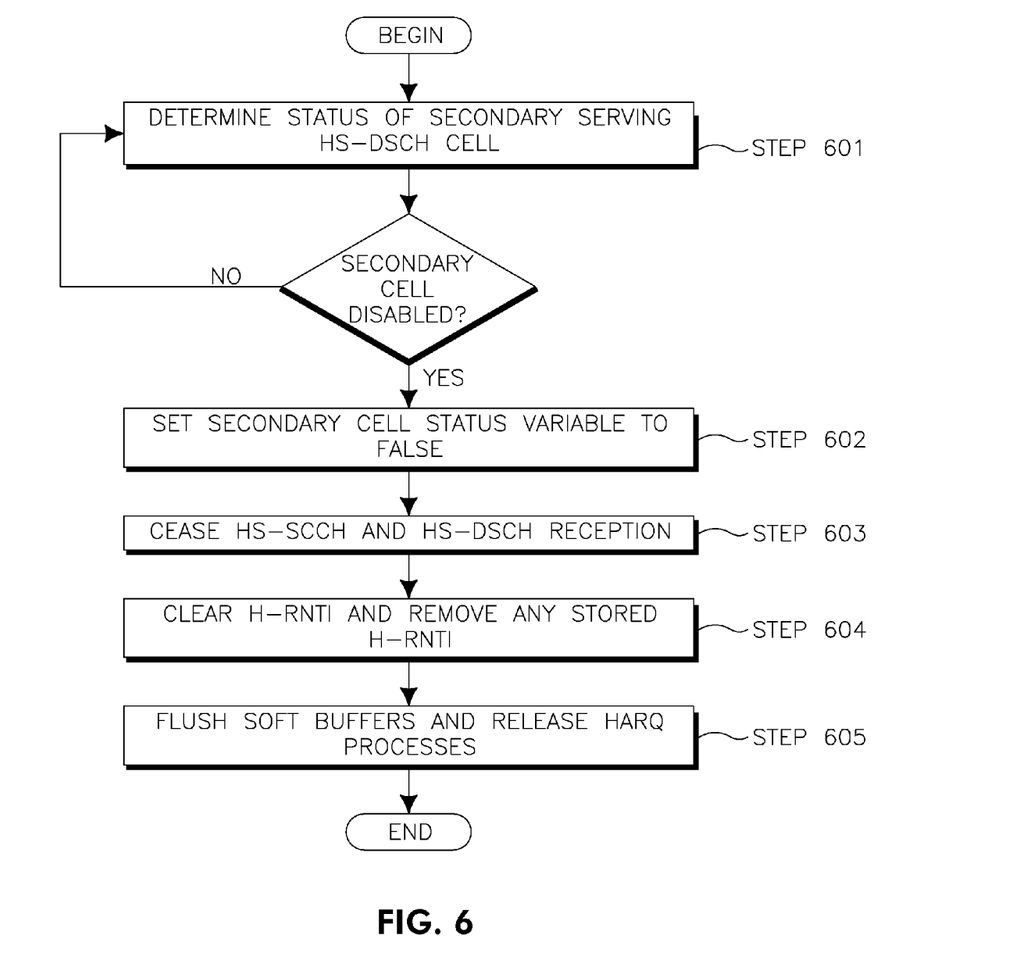
FIG. 6 shows an example flow diagram of the disclosed method.

FIG. 6 is a flow diagram for procedures for disabling secondary cells. Upon receipt of an RRC message, the WTRU 410 determines the status of the Secondary serving HS-DSCH cell (601). This determination may be performed by checking a variable included in the RRC message that may indicate whether the secondary cell is enabled. Also, if the RRC message does not include information relating to the secondary HS-DSCH cell, the previous status of the cell may be checked. If the previous status was TRUE (i.e., indicating that the secondary HS-DSCH serving sell was enabled), the WTRU 410 may determine that the non-inclusion of the secondary HS-DSCH information means that the secondary HS-DSCH is to be disabled, or that the status remains the same.

If the WTRU 410 determines that the secondary serving HS-DSCH cell is to be disabled, the WTRU 410 sets the status variable, SECONDARY_HS_DSCH_RECEPTION to FALSE (602). The WTRU 410 then ceases any HS-SCCH and HS-DSCH reception procedures related to the secondary serving HS-DSCH cell (step 603). The variable H_RNTI is cleared, and any stored H_RNTI associated with the secondary serving HS-DSCH cell, is removed (604). The WTRU 410 then flushes the HARQ buffers for all HARQ processes associated with the secondary serving HS-DSCH cell and releases all HARQ resources associated with the secondary serving HS-DSCH cell (605).

In another method, the WTRU 410 may be configured to activate/deactivate a secondary carrier via a layer 1 (L1) control signal. By way of example, the L1 control signal for deactivating the secondary HS-DSCH carrier is conveyed via a HS-SCCH order. The WTRU 410 may then detect that a secondary serving HS-DSCH cell, has been deactivated in an HS-SCCH order. Next the WTRU 410 may flush the HARQ buffers associated with the secondary HS-DSCH serving cell.

Upon reactivation of the secondary downlink carrier (e.g., via an HS-SCCH order), the MAC layer may treat the next received HARQ transmission for each configured HARQ processes associated with the secondary HS-DSCH serving cell as a first transmission (i.e., a New Data indicator bit is reset).

In another method, the secondary serving HS-DSCH cell may be disabled based on the status of the primary serving HS-DSCH cell. Accordingly, primary status variable, e.g., HS-DSCH_RECEPTION, may be monitored by the WTRU 410. The variable HS_DSCH_RECEPTION relates to HS-DSCH reception on the anchor carrier; when it is TRUE, HS-DSCH reception on the serving HS-DSCH cell may be enabled and when it is FALSE, HS-DSCH reception on the serving HS-DSCH cell may be disabled. When the primary status variable indicates a FALSE, the WTRU 410 recognizes that the primary serving cell has been disabled. As such, the WTRU 410 sets the status of the secondary status variable to FALSE for the secondary serving HS-DSCH cell and performs the remaining procedures as described above. In accordance with this disclosed method, when HS_DSCH_RECEPTION is FALSE, the SECONDARY_CELL_HS_DSCH_RECEPTION may also be FALSE and the RRC in that case may release all the HS-DSCH resources and reset the entire MAC-ehs.

When the primary status variable is TRUE, the WTRU 410 determines the status of the secondary status variable and operates in accordance with the method disclosed above and shown in FIG. 6.

The variable SECONDARY_CELL_HS DSCH_RECEPTION may be set to TRUE when the WTRU 410 is in CELL DCH state and operating in Frequency-division duplexing (FDD); the WTRU 410 has stored the Information Element (IE) "Downlink Secondary Cell Info FDD", IE "HARQ info", IE "Measurement Feedback Info", and IE "Uplink DPCH Power Control Info" including stored $\Delta_{ACK}$, $\Delta_{NACK}$ and ACK-NACK Repetition factor; HS_DSCH_RECEPTION is set to TRUE; the variable H_RNTI (associated with the secondary serving HS-DSCH cell) is set; and the WTRU 410 has a stored IE "HS-SCCH info" (associated to the secondary serving HS-DSCH cell). On the condition that these are not met, and the variable SECONDARY_CELL_HS_DSCH_RECEPTION is set to TRUE, the WTRU 410 disables the secondary serving cell by setting the variable SECONDARY_CELL_HS_DSCH_RECEPTION to FALSE, for example. Any HS_SCCH reception procedures are ceased by the WTRU 410 that are related to the secondary serving HS-DSCH cell. The variable H_RNTI may then be cleared, and any stored H-RNTI associated with the secondary serving HS-DSCH cell removed.

When the variable SECONDARY_CELL_HS_DSCH_RECEPTION is set to TRUE, the WTRU 410 performs HS-DSCH reception procedures for the secondary serving HS-DSCH cell according to the stored HS-PDSCH configuration.

While described in the context of a dual-cell HS-DSPA 3GPP WCDMA network, some of the concepts may also apply to other technologies employing HARQ with multiple carriers. In addition, while the invention is described in the context of a single supplementary cell, the concepts may also apply to multiple cells as well.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

The invention claimed is:

1. A method for multi-cell wireless communication, the method comprising:
   while a wireless transmit/receive unit (WTRU) is configured to simultaneously receive a first data from an anchor serving cell and a second data from a secondary serving cell, determining a status of reception on the secondary serving cell based on a value of a secondary cell status variable, and wherein the anchor serving cell and the secondary serving cell are each associated with respective hybrid automatic repeat request (HARQ) processes; and
   on a condition that the reception on the secondary serving cell is determined to be disabled based on the value of the secondary cell status variable, flushing HARQ buffers of the HARQ processes associated with the secondary serving cell while maintaining HARQ buffers of the HARQ processes associated with the anchor serving cell.

2. The method of claim 1, further comprising receiving a radio resource control (RRC) message that indicates whether the secondary serving cell is enabled.

3. The method of claim 2, wherein the status of the reception on the secondary serving cell is based on the RRC message.

4. The method of claim 1, wherein the secondary cell status variable comprises a SECONDARY_CELL_HS_DSCH_RECEPTION variable that indicates that the reception on the secondary serving cell is enabled when the value of the variable is set to true and indicates that the reception on the secondary serving cell is disabled when the value of the variable is set to false.

5. The method of claim 1, further comprising continuing to receive the first data from the anchor serving cell after the reception on the secondary serving cell is determined to be disabled.

6. The method of claim 1, wherein the first data is received from the anchor serving cell and the second data is received from the secondary serving cell via respective High Speed Downlink Shared Channel (HS-DSCH) carriers.

7. The method of claim 1, further comprising releasing HARQ resources associated with the secondary serving cell while maintaining HARQ resources associated with the anchor serving cell on the condition that the reception on the secondary serving cell is determined to be disabled.

8. The method of claim 1, further comprising clearing a High Speed Downlink Shared Channel (HS-DSCH) Radio Network Temporary Identifier (H-RNTI) associated with the secondary serving cell on the condition that the reception on the secondary serving cell is determined to be disabled.

9. The method of claim 1, further comprising receiving a signal including layer 1 (L1) signaling, wherein the L1 signaling includes an indication to activate or deactivate a High Speed Downlink Shared Channel (HS-DSCH) carrier.

10. The method of claim 9, wherein the L1 signaling is a High Speed Shared Control Channel (HS-SCCH) order.

11. The method of claim 9, wherein the status of the reception on the secondary serving cell is determined based on the indication in the L1 signaling that comprises the value of the secondary cell status variable.

12. The method of claim 1, wherein the HARQ processes associated with the anchor serving cell are associated with a first HARQ entity, and wherein the HARQ processes associated with the secondary serving cell are associated with a second HARQ entity.

13. The method of claim 1, wherein the first data and the second data comprise different data.

14. A wireless transmit/receive unit (WTRU) capable of multi-cell wireless communication, the WTRU comprising:
at least one receiver unit configured to simultaneously receive a first data from an anchor serving cell and a second data from a secondary serving cell, and wherein the anchor serving cell and the secondary serving cell are each associated with respective hybrid automatic repeat request (HARQ) processes; and
a processor configured to:
while the at least one receiver unit is configured to simultaneously receive the first data from the anchor serving cell and the second data from the secondary serving cell, determine a status of reception on the secondary serving cell based on a value of a secondary cell status variable; and
on a condition that the reception on the secondary serving cell is determined to be disabled based on the value of the secondary cell status variable, flush HARQ buffers of the HARQ processes associated with the secondary serving cell while maintaining HARQ buffers of the HARQ processes associated with the anchor serving cell.

15. The WTRU of claim 14, wherein the processor is configured to receive, via the at least one receiver unit, a radio resource control (RRC) message that indicates whether the secondary serving cell is enabled.

16. The WTRU of claim 15, wherein the processor is configured to determine the status of the reception on the secondary serving cell based on the RRC message.

17. The WTRU of claim 14, wherein the secondary cell status variable comprises a SECONDARY_CELL_HS_D-SCH_RECEPTION variable that indicates that the reception on the secondary serving cell is enabled when the value of the variable is set to true and indicates that the reception on the secondary serving cell is disabled when the value of the variable is set to false.

18. The WTRU of claim 14, wherein the processor is further configured to continue to receive, via the at least one receiver unit, the first data from the anchor serving cell after the reception on the secondary serving cell is determined to be disabled.

19. The WTRU of claim 14, wherein the at least one receiver unit is configured to receive the first data from the anchor serving cell and the second data from the secondary serving cell via respective High Speed Downlink Shared Channel (HS-DSCH) carriers.

20. The WTRU of claim 14, wherein the processor is configured to release HARQ resources associated with the secondary serving cell while maintaining HARQ resources associated with the anchor serving cell on the condition that the reception on the secondary serving cell is determined to be disabled.

21. The WTRU of claim 14, wherein the processor is configured to clear a High Speed Downlink Shared Channel (HS-DSCH) Radio Network Temporary Identifier (H-RNTI) associated with the secondary serving cell on the condition that the reception on the secondary serving cell is determined to be disabled.

22. The WTRU of claim 14, wherein the processor is further configured to receive, via the at least one receiver unit, a signal including layer 1 (L1) signaling, wherein the L1 signaling includes an indication to activate or deactivate a High Speed Downlink Shared Channel (HS-DSCH) carrier.

23. The WTRU of claim 22, wherein the L1 signaling is a High Speed Shared Control Channel (HS-SCCH) order.

24. The WTRU of claim 22, wherein the processor is configured to determine the status of the reception on the secondary serving cell based on the indication in the L1 signaling that comprises the value of the secondary cell status variable.

25. The WTRU of claim 14, wherein the at least one HARQ processes associated with the anchor serving cell are associated with a first HARQ entity, and wherein the HARQ processes associated with the secondary serving cell are associated with a second HARQ entity.

26. The WTRU of claim 14, wherein the first data and the second data comprise different data.

* * * * *